(12) United States Patent
Tsujimoto

(10) Patent No.: US 8,368,933 B2
(45) Date of Patent: Feb. 5, 2013

(54) IMAGE FORMING DEVICE CONFIGURED TO RECORD PRINT HISTORY IN A SERVER

(75) Inventor: Shohei Tsujimoto, Mie (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 454 days.

(21) Appl. No.: 12/609,097

(22) Filed: Oct. 30, 2009

(65) Prior Publication Data

US 2010/0110488 A1 May 6, 2010

(30) Foreign Application Priority Data

Oct. 31, 2008 (JP) ................................. 2008-282060

(51) Int. Cl.
*G06K 15/02* (2006.01)

(52) U.S. Cl. ...................... 358/1.15; 358/1.13; 358/1.14; 705/14.25; 705/14.53; 347/195

(58) Field of Classification Search .................. 358/1.13, 358/1.14, 1.15; 705/14.25, 14.53; 347/195
See application file for complete search history.

(56) References Cited

U.S. PATENT DOCUMENTS

| | | | |
|---|---|---|---|
| 6,999,191 B2 | 2/2006 | Yamada et al. | |
| 7,123,372 B2 | 10/2006 | Yamada et al. | |
| 2001/0055125 A1 | 12/2001 | Yamada et al. | |
| 2002/0054323 A1 | 5/2002 | Yamada et al. | |
| 2004/0268177 A1* | 12/2004 | Ji et al. ................................ 714/6 |
| 2006/0028670 A1* | 2/2006 | Amano .......................... 358/1.13 |
| 2006/0061820 A1* | 3/2006 | Okamoto et al. ............. 358/1.15 |
| 2006/0085697 A1* | 4/2006 | Takeuchi et al. ................ 714/50 |
| 2007/0266237 A1 | 11/2007 | Kuroki |
| 2008/0112009 A1* | 5/2008 | Tojo ............................... 358/1.15 |
| 2008/0240827 A1* | 10/2008 | Yamazaki ........................ 400/73 |

FOREIGN PATENT DOCUMENTS

| | | |
|---|---|---|
| JP | 2001-350936 | 12/2001 |
| JP | 2002-082792 A | 3/2002 |
| JP | 2002-163097 | 6/2002 |
| JP | 2003-177901 A | 6/2003 |
| JP | 2007-174258 A | 7/2007 |
| JP | 2007-304990 A | 11/2007 |
| JP | 2007-304991 A | 11/2007 |
| JP | 2007-304993 A | 11/2007 |
| JP | 2008-148284 A | 6/2008 |

OTHER PUBLICATIONS

JP Office Action dtd Sep. 28, 2010, JP Appln. 2008-282060.

* cited by examiner

*Primary Examiner* — Jacky X Zheng
(74) *Attorney, Agent, or Firm* — Banner & Witcoff, Ltd.

(57) ABSTRACT

An image forming device, comprising: an image formation unit configured to form an image on a recording medium in accordance with a print command transmitted from an external device; a print history writing unit configured to record print history concerning image formation by the image formation unit in a server connected to the image forming device via a network; and a writing information transmission unit configured to transmit, to the external device, writing information including information indicating whether the print history writing unit has successfully recorded the print history in the server.

26 Claims, 3 Drawing Sheets

....... NORMAL NAME COMMAND

NORMAL PRINT RESULT (Success or Failure)

····· TRANSMIT TWO TIMES

····· TRANSMIT TWO TIMES

IMAGE FORMING DEVICE CONFIGURED TO RECORD PRINT HISTORY IN A SERVER

CROSS-REFERENCE TO RELATED APPLICATION

This application claims priority under 35 U.S.C. §119 from Japanese Patent Application No. 2008-282060, filed on Oct. 31, 2008. The entire subject matter of the application is incorporated herein by reference.

BACKGROUND

1. Technical Field

Aspects of the present invention relate to an image forming device having a function of recording print history on a server provided on a network.

2. Related Art

Image forming devices having a function of recording, as a print history, a result of image formation on a server provided on a network in addition to having a function of forming an image on a recording medium (e.g., a sheet of paper) in accordance with a print command transmitted from a user terminal (e.g., a personal computer) have been widely used.

SUMMARY

The image forming device of this type is used, for example, in an accounting system for billing users based on the print history recorded on the server. It is desired to enhance performance of such an accounting system in regard to usability of a user of a user terminal.

Aspects of the present invention are advantageous in that an image forming device capable of notifying a user of a recording status of print history to a server is provided.

According to an aspect of the invention, there is provided an image forming device, comprising: an image formation unit configured to form an image on a recording medium in accordance with a print command transmitted from an external device; a print history writing unit configured to record print history concerning image formation by the image formation unit in a server connected to the image forming device via a network; and a writing information transmission unit configured to transmit, to the external device, writing information including information indicating whether the print history writing unit has successfully recorded the print history in the server.

According to another aspect of the invention, there is provided an image forming device, comprising: an image formation unit configured to form an image on a recording medium in accordance with a print command transmitted from an external device; a print history writing unit configured to record print history concerning image formation by the image formation unit in a server connected to the image forming device via a network; and an information transmission unit configured to transmit information including at least part of the print history to the external device.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
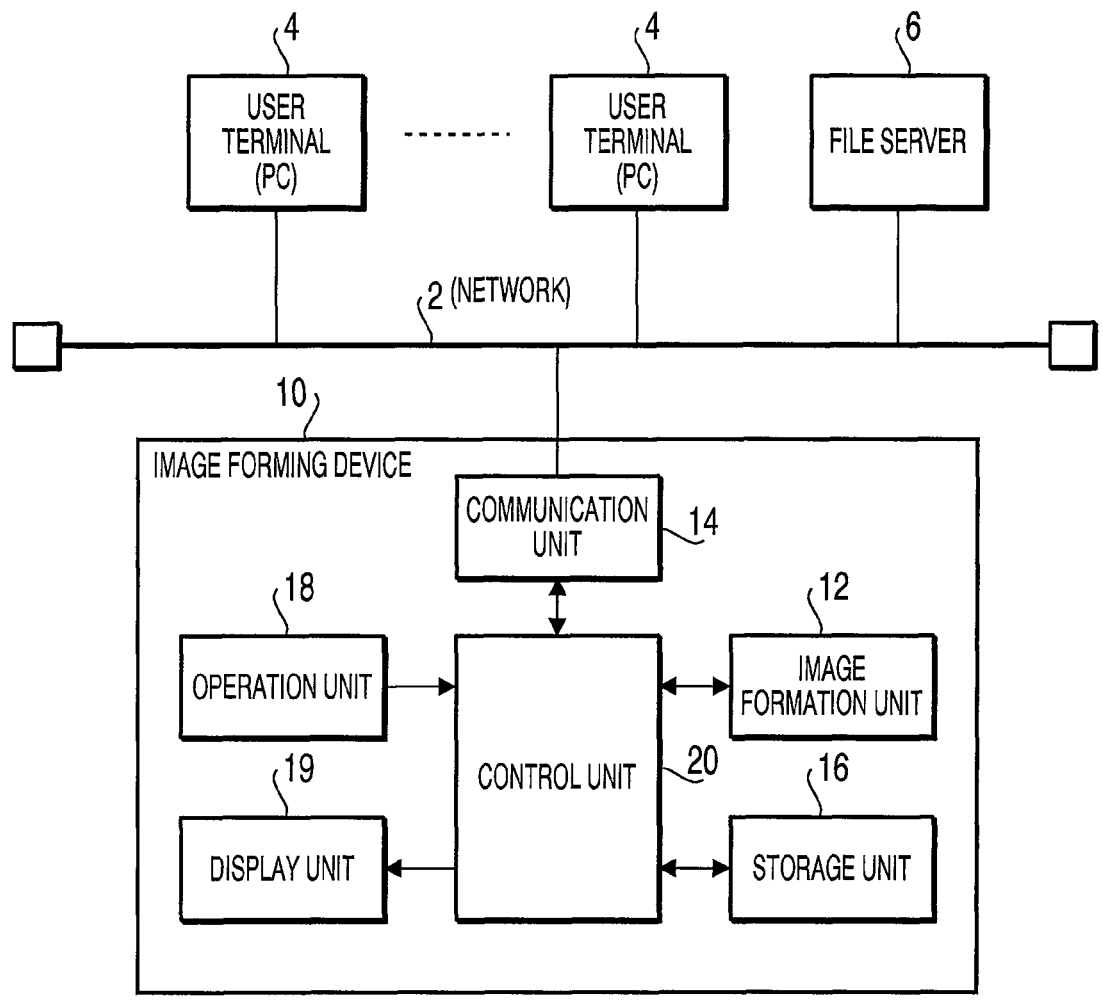
FIG. 1 is a block diagram of an image forming device and peripheral devices.

As shown in FIG. 1, an image forming device 10 according to the embodiment includes an image formation unit 12 which forms an image on a recording medium (e.g., a sheet of paper), a communication unit 14 which performs communication with user terminals (e.g., personal computers) 4 or a file server 6 via a network (e.g., an Ethernet®) 2, and a storage unit 12 which stores temporarily data (e.g., print data) transmitted from the user terminal 4. The file server 6 is, for example, a CIFS (Common Internet File system) server.

The image forming device 10 further includes a control unit 20 which controls internal components of the image forming device 10, an operation unit 18 used by a user to input various types of instructions to the image forming device 10, and a display unit 19 on which various types of information such as an operation status of the image forming device 10 and messages are displayed.

The control unit 20 is implemented, for example, by a microcomputer chip on which a CPU, a ROM and a RAM are embedded. The control unit 20 executes print control by receiving a print command from the user terminal 4 via the communication unit 14 and controlling the image formation unit 12 in accordance with the print command.

When executing the print control, the control unit 20 writes history concerning print control (hereafter, frequently referred to as print history or a log) into the file server 6 via the communication unit 14, and returns a result (writing information) concerning writing of the print history to the file server 6 and/or a result (a print result) of image formation by the image formation unit 12, to the user terminal 4 which has transmitted the print command.

It should be noted that an LPR protocol which is generally used for communication for printing is used for transmission of a print command from the user terminal 4 to the image forming device 10 and transmission of the writing information and the print result from the image forming device 10 to the user terminal 4. On the other hand, for transmission of the log from the image forming device 10 to the file server 6, a protocol (e.g., CIFS) different from LPR is used.

Figure 2:
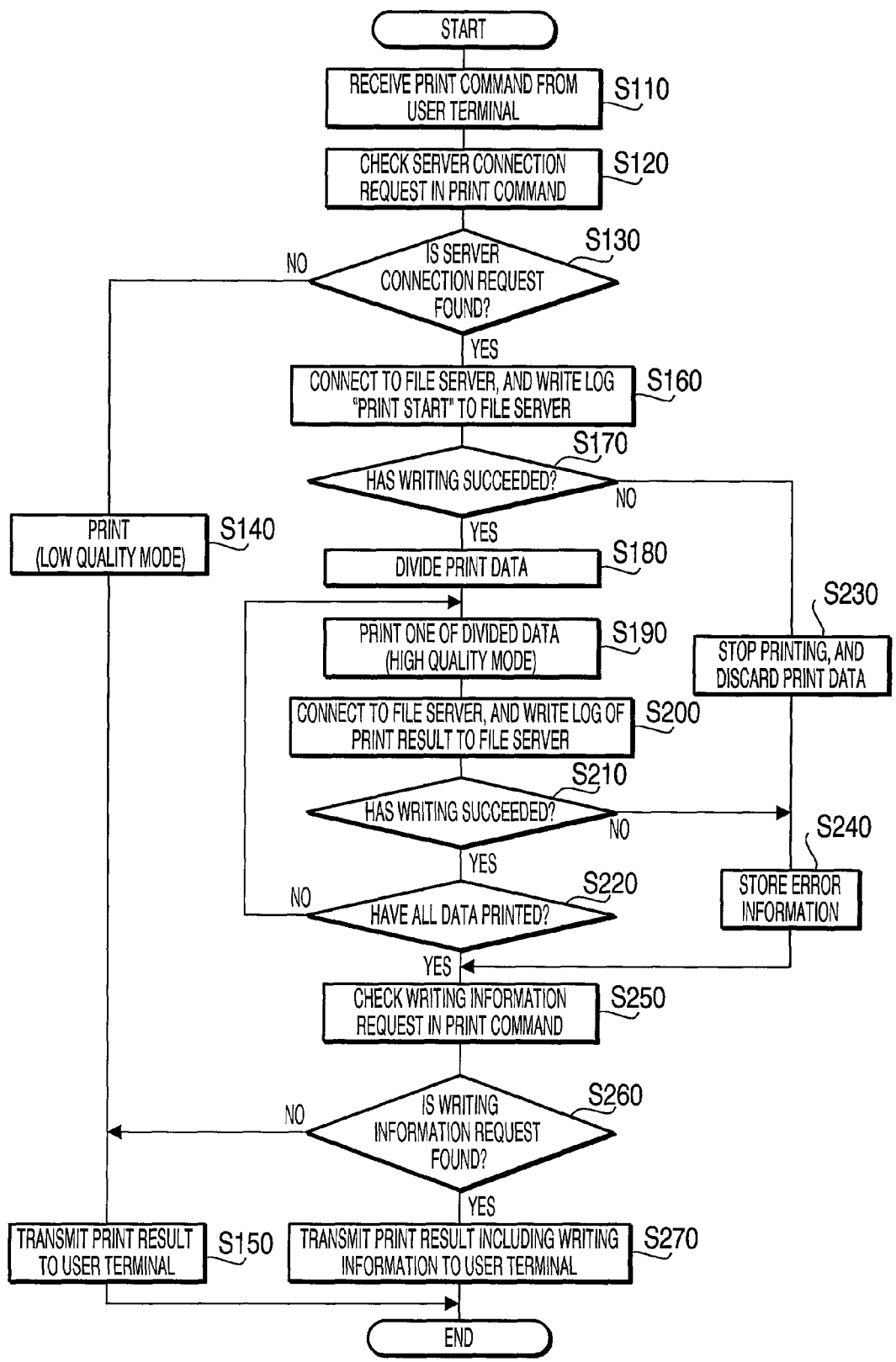
FIG. 2 is a flowchart illustrating a print control process executed on the image forming device.

Hereafter, a print control process executed under control of the control unit 20 of the image forming device 10 is explained with reference to FIG. 2. The print control process is executed when the image forming device 10 receives a print command from the user terminal 4.

When the print control process is started, the control unit 20 receives the print command and print data from the user terminal 4, and temporarily stores the received data in the storage unit 16 (step S110). Then, the control unit 20 checks a server connection request provided in the print command.

That is, in this embodiment, a command indicating whether to record, as print history (i.e., a log), information concerning execution of image formation by the image forming device 10 can be included in the print command as a special code on the side of the user terminal 4 (see special codes shown in FIGS. 3B to 3F).

In step S120, the control unit 20 search the print command for special codes to check whether the print command includes the server connection request for recording the log on the file server.

After step S120 is processed, the control unit 20 judges whether the server connection request has been found based on the checking result in step S120. It should be noted that when no special code (a Special Code) is included in the print command, the control unit 20 may judge that the server connection request is received.

Next, when the control unit 20 judges that the sever connection request is not included (S130: NO), the control unit 20 controls the image formation unit 12 in a low quality print mode (or a low resolution mode) so as to execute the image formation based on the print command received in step S110 in a low resolution mode (step S140). After completion of the image formation or the image formation is finished in a printing error state, the control unit 20 returns the print result (Success or Failure: see FIG. 3G) to the user terminal 4 which has transmitted the print command (step S150). Then, the print control process terminates.

It should be noted that the print operation is performed in a low quality print mode in step S140 because the received print command does not have the server connection request, and therefore there is no need for recording the log on the file server 6.

An administrator of the image forming device 10 is able to check a use condition of the image forming device 10 by the user of the user terminal 4 based on the log recorded on the file server 6. However, because the log is not recorded on the file server 6 in the case of step S104, the administrator is not able to know the use condition of the image forming device 10 and therefore the administrator is not able to bill the user. For this reason, in the case of step S104, only a low quality print mode is allowed for checking of an image. The low quality print mode may be a print mode where color printing is prohibited or an ink saving mode where use of the amount of ink is suppressed.

If it is judged in step S130 that the server connection request is found (S130: YES), control proceeds to step S160. In step S160, the control unit 20 operates to connect to the file server 6 via the communication unit 14, and tries to write a log "print start" into the print server 6, and then judges whether the writing of the log have successfully finished (step S170).

If writing of the log has succeeded (step S170: YES), the control unit 20 divides the print data received together with the print command from the user terminal 4 into a plurality of pieces of data on a basis of a unit of one page (step S180). Then, the control unit 20 outputs each divided data to the image formation unit 12 to control the image formation unit 12 to execute the print operation for a page (step S190). It should be noted that the print operation in step S190 is executed in a high resolution and high quality mode. That is, the print operation in step S190 is executed in accordance with a print condition designated by the print command.

After thus finishing the print operation for one page, control proceeds to step S200 where the control unit 20 operates to connect to the file server 6 and to try to write the log of the print result into the file server 6. Then, the control unit 20 judges whether writing of the log has finished successfully.

When writing of the log has succeeded (S210: YES), the control unit 20 judges whether the printing operation has finished for all of the print data received from the user terminal 4 (step S220). When all of the print data have not been processed (S220: NO), steps S190 to S220 are repeated to print the next page in a high quality mode. When all of the pint data has processed (S220: YES), control proceeds to step S250.

When the control unit 20 judges in step S170 that writing of the log has failed (S170: NO), control proceeds to step S230. In step S230, the control unit 20 stops the printing operation based on the print command received from the user terminal 4, and discards the print data. Then, the control unit 20 stores error information indicating that the printing operation is stopped (step S240). Then, control proceeds to step S250.

More specifically, the error information includes information indicating that writing of the log executed before the start of the printing of the first page has failed, and information indicating factors of failure of writing of the log (e.g., a communication error on the network, an access authority error to a log file, and a disk full state of the file server 6).

When the control unit 20 judges in step S210 that writing of the log has failed (S210: NO), control proceeds to step S240 where the control unit 20 stores error information including the number of pages that have been successfully printed before the failure of writing of the current log. Then, control proceeds to step S250.

More specifically, the error information includes information indicating that writing of the log has failed at an intermediate page within the entire print data, and information indicating factors of writing failure of the log (e.g., a communication error on the network, an access authority error to a log file, and a disk full state of the file server 6).

In step S250, the control unit 20 checks whether a writing information request is included in the print command. That is, in this embodiment, the user terminal 4 which has transmitted the print command is allowed to designate, through use of a special code, a command for instructing the image forming device 10 to transmit, to the user terminal 4, the writing result of the log with respect to the filer server 6.

In step S250, the control unit 20 checks the writing information request requesting transmission of the wiring result of the log (the writing information) included in the print command based on the special code included in the print command.

Based on the checking result in step S250, the control unit 20 judges whether the writing information request is found (step S260). If the writing information request is not found (S260: NO), control proceeds to step S150 where the control unit 20 returns only the print result ("Success" or "Failure"; see FIG. 3G) to the user terminal 4 through use of the LPR protocol. Then, the print control process terminates. On the other hand, when the writing information request is found (S260: YES), control proceeds to step S270 where the control unit 20 returns the print result including the writing information to the user terminal 4 through use of the LPR protocol. Then, the print control process terminates.

When all of the print data can not be successfully printed through steps S190 to S220, the control unit 20 may create the writing information indicating information as to whether the factor of the failure is the writing error of the log to the file server 6 and information indicating the number of the last page of pages which have been successfully printed.

Figure 3A:
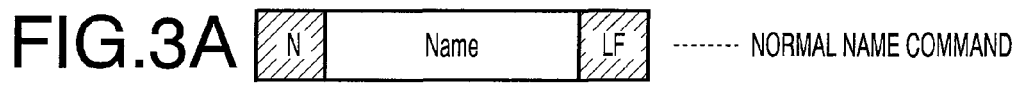
FIGS. 3A to 3F illustrate examples of a data structure of a command transmitted from a user terminal to the image forming device.
Figure 3B:
Figure 3C:
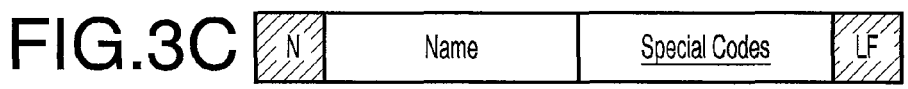
Figure 3D:
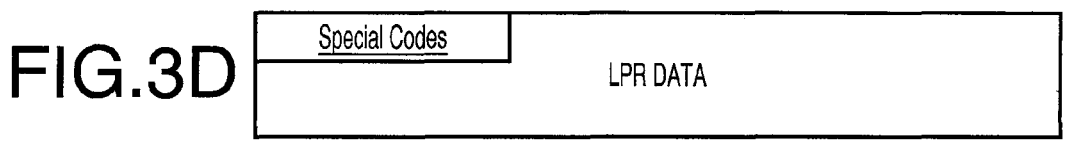
Figure 3E:
Figure 3F:
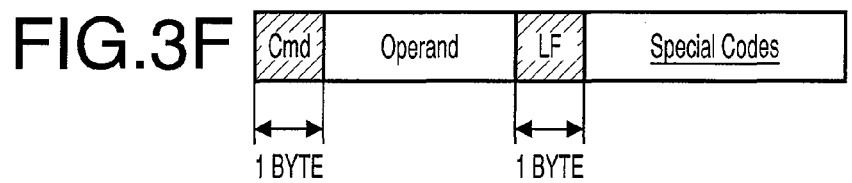
Figure 3G:
FIGS. 3G to 3K illustrate examples of a data structure of a print result transmitted from the image forming device to the user terminal.

If step S240 is processed, the print result to be transmitted in step S150 or S270 is "Failure" (see FIG. 3G).

As shown in FIGS. 3H to 3K, in the writing information, a particular code (e.g., SP code) which is not used typically in the LPR protocol may be used, in contrast to the codes to be used to transmit the print result in the LPR protocol.

Figure 3H:
Figure 3I:
Figure 3J:
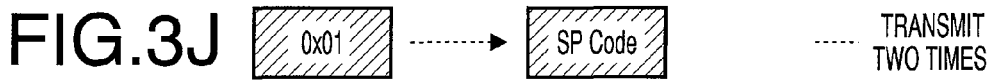
Figure 3K:
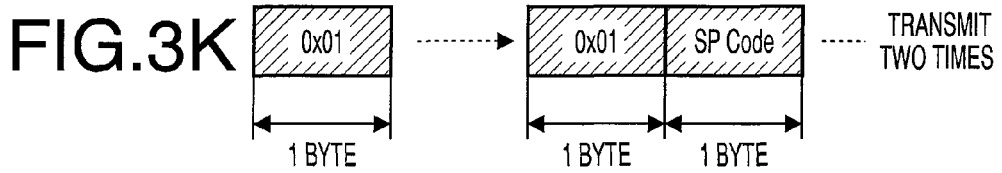

As examples of ways for transmitting the SP code, only the SP code may be transmitted by incorporating the print result into the SP code as shown in FIG. 3H, the SP code may be added to the end of the print result ("Failure") as shown in FIG. 3I, the print result ("Failure") and the SP code may be transmitted separately as shown in FIG. 3J, the print result ("Failure") and the SP code added to the print result ("Failure") may be transmitted separately as shown in FIG. 3K.

When a special code is incorporated in the print command on the user terminal 4, a character string representing the special code may be set to the position for the "source filename" in a typical "Name command" as shown in FIGS. 3A and 3B. Alternatively, a particular string representing the special code may be set to the end of the "source filename" as shown in FIG. 3C.

Alternatively, as shown in FIGS. 3D and 3E, a particular string may be added to the print data to be transmitted, as a header or a footer. Alternatively, as shown in FIG. 3F, a particular string may be set to the end of a certain command.

As described above, according to the embodiment, when the server connection request is included in the print command transmitted from the user terminal 4, the image forming device 10 executes the print operation on a page-by-page basis (steps S180 to S220), and writes the log to the file server 6 at the start of printing and at timing of completion of printing of each page (step S160 and S210). Furthermore, when writing of the log has failed, the image forming device 10 stops the printing, and stores error information as a writing error (step S240).

When the error information is thus stored or all the print data has printed, the image forming device 10 judges whether the writing information request is included in the print command (step S260). When the writing information request is included in the print command, the image forming device 10 transmits the print result including the writing information to the user terminal 4 (step S270).

Therefore, when the user instructs the image forming device 10 to execute the print operation by transmitting the print command, the user of the user terminal 4 is able not only to check whether the log (print information) is successfully written to the file server 6 but also to know whether the factor of failure is an writing error of the log to the file server 6 or a malfunction (e.g., paper jamming) of the image forming device 10. As described above, the log is saved each time the printing for one sheet of paper is finished, and when an error occurs, the number of pages for which the printing has finished successfully is notified to the user. Therefore, the image forming device 10 is extremely convenient for the user.

The server connection request and the writing information request to be transmitted to the image forming device 10 from the user terminal 4 are included in the print command, and the same protocol as that for transmission of the print command is also used for transmission of the writing information from the user terminal 4 to the image forming device 10. Such a configuration eliminates the need for installing a dedicated protocol for receiving such information on the image forming device 10. Therefore, the print control process according to the embodiment can be achieved without increasing the cost for implementing a dedicated protocol on the user terminal 4 and the image forming device 10.

According to the embodiment, since a result of transmission of the print history to the file server is provided from the image forming device to the user terminal, the user is able to confirm whether the print history is successfully recorded on the server. Therefore, even if improper billing (e.g., illegal billing) is made in a billing system shown in FIG. 1, the user of the user terminal 4 is able to know the improper billing.

Although the present invention has been described in considerable detail with reference to certain preferred embodiments thereof, other embodiments are possible.

In the above described embodiment, the print result and the print result including the writing information is transmitted to the user terminal 4 in steps S150 and S270, respectively. However, the transmission of the print result in steps S150 and S270 may be executed only when an error occurs during the print operation (i.e., only when all of the print data is not printed in steps S190 to S220).

In the above described embodiment, the image forming device 10 is a dedicated device specifically designed for image formation that executes the image formation on a sheet of paper through the image formation nit 12 in accordance with the print command transmitted from the user terminal 4. However, the feature of the image forming device according to the embodiment may be implemented on a multifunction peripheral having multiple functions including a print function, a scanner function and a copying function.

In the above described embodiment, the user terminal is a personal computer. However, various types of information terminals, such as a portable device and a game machine, which are able to transmit a print command in a predetermined protocol (e.g. LPR) may be used as an user terminal.

What is claimed is:

1. An image forming device, comprising:
    an image formation unit configured to form an image on a recording medium in accordance with a print command transmitted from an external device;
    a print history writing unit configured to record print history concerning image formation by the image formation unit in a server connected to the image forming device via a network each time the image formation unit finishes the image formation corresponding to one page of the recording medium, and to make a judgment on whether the print history has been successfully recorded in the server; and
    a writing information transmission unit configured to transmit, to the external device, writing information including information indicating whether the print history writing unit has successfully recorded the print history in the server, based on a result of the judgment by the print history writing unit,
    wherein
    when the print history writing unit has not successfully recorded the print history in the server, the image formation unit is configured to stop the image formation based on the print command; and
    when the image formation unit stops the image formation, the writing information transmission unit transmits, to the external device, the writing information including information indicating a number of pages of the recording medium for which the print history has successfully recorded in the server based on the print command.

2. The image forming device according to claim 1, wherein:
    the print history writing unit is configured to write the print history in the server before the image formation unit which has received the print command starts to form the image on the recording medium, and to write the print history in the server after the image formation unit has finished forming the image on the recording medium; and
    when the print history writing unit has not successfully recorded the print history in the server before the image formation unit starts to form the image on the recording medium, the image formation unit stops the image formation.

3. The image forming device according to claim 1, wherein the writing information transmission unit is configured to transmit the writing information to the external device using a certain protocol which is equal to a protocol used for communication for the print command.

4. The image forming device according to claim 1, wherein:
the print command includes a command indicating whether to record the print history in the server; and
the print history writing unit is configured to record the print history in the server when the print command includes the command to record the print history in the server.

5. The image forming device according to claim 4, wherein when the command included in the print command indicates not to record the print history, the image formation unit forms the image while restricting quality of the image.

6. The image forming device according to claim 4, wherein when the command indicating whether to record the print history in the server is not included in the print command, the print history writing unit records the print history in the server.

7. The image forming device according to claim 1, wherein the writing information transmission unit is configured to transmit the writing information to the external device when a command to transmit the writing information is included in the print command, and not to transmit the writing information to the external device when the command to transmit the writing information is not included in the print command.

8. The image forming device according to claim 1, further comprising a print result transmission unit configured to transmit a result of the image formation by the image formation unit to the external device.

9. An image forming device, comprising:
an image formation unit configured to form an image on a recording medium in accordance with a print command transmitted from an external device;
a control unit configured to record print history concerning image formation by the image formation unit in a server connected to the image forming device via a network each time the image formation unit finishes the image formation corresponding to one page of the recording medium, and to make a judgment on whether the print history has been successfully recorded in the server; and
a communication unit configured to transmit, to the external device, writing information including information indicating whether the control unit has successfully recorded the print history in the server, based on a result of the judgment by the control unit,
wherein
when the control unit has not successfully recorded the print history in the server, the image formation unit is configured to stop the image formation based on the print command; and
when the image formation unit stops the image formation, the communication unit transmits, to the external device, the writing information including information indicating a number of pages of the recording medium for which the print history has successfully recorded in the server based on the print command.

10. The image forming device according to claim 9, wherein:
the control unit is configured to write the print history in the server before the image formation unit which has received the print command starts to form the image on the recording medium, and to write the print history in the server after the image formation unit has finished forming the image on the recording medium; and
when the control unit has not successfully recorded the print history in the server before the image formation unit starts to form the image on the recording medium, the image formation unit stops the image formation.

11. The image forming device according to claim 9, wherein:
the print command includes a command indicating whether to record the print history in the server; and
the control unit is configured to record the print history in the server when the print command includes the command to record the print history in the server.

12. The image forming device according to claim 11, wherein when the command included in the print command indicates not to record the print history, the image formation unit forms the image while restricting quality of the image.

13. The image forming device according to claim 11, wherein when the command indicating whether to record the print history in the server is not included in the print command, the control unit records the print history in the server.

14. The image forming device according to claim 9, wherein the communication unit is configured to transmit the writing information to the external device when a command to transmit the writing information is included in the print command, and not to transmit the writing information to the external device when the command to transmit the writing information is not included in the print command.

15. An image forming device, comprising:
an image formation unit configured to form an image on a recording medium in accordance with a print command transmitted from an external device, the print command includes a command indicating whether to record the print history in the server;
a print history writing unit configured to record print history concerning image formation by the image formation unit in a server connected to the image forming device via a network when the print command includes the command to record the print history in the server, and to make a judgment on whether the print history has been successfully recorded in the server; and
a writing information transmission unit configured to transmit, to the external device, writing information including information indicating whether the print history writing unit has successfully recorded the print history in the server, based on a result of the judgment by the print history writing unit,
wherein when the command included in the print command indicates not to record the print history, the image formation unit forms the image while restricting quality of the image.

16. The image forming device according to claim 15, wherein:
the print history writing unit is configured to write the print history in the server before the image formation unit which has received the print command starts to form the image on the recording medium, and to write the print history in the server after the image formation unit has finished forming the image on the recording medium; and
when the print history writing unit has not successfully recorded the print history in the server before the image formation unit starts to form the image on the recording medium, the image formation unit stops the image formation.

17. The image forming device according to claim 16, wherein:
- the print history writing unit is configured to record the print history each time the image formation unit finishes the image formation corresponding to one page of the recording medium;
- when the print history writing unit has not successfully recorded the print history in the server, the image formation unit is configured to stop the image formation based on the print command; and
- when the image formation unit stops the image formation, the writing information transmission unit transmits, to the external device, the writing information including information indicating a number of pages of the recording medium for which the print history has successfully recorded in the server based on the print command.

18. The image forming device according to claim 15, wherein the writing information transmission unit is configured to transmit the writing information to the external device using a certain protocol which is equal to a protocol used for communication for the print command.

19. The image forming device according to claim 15, wherein when the command indicating whether to record the print history in the server is not included in the print command, the print history writing unit records the print history in the server.

20. The image forming device according to claim 15, wherein the writing information transmission unit is configured to transmit the writing information to the external device when a command to transmit the writing information is included in the print command, and not to transmit the writing information to the external device when the command to transmit the writing information is not included in the print command.

21. The image forming device according to claim 15, further comprising a print result transmission unit configured to transmit a result of the image formation by the image formation unit to the external device.

22. An image forming device, comprising:
- an image formation unit configured to form an image on a recording medium in accordance with a print command transmitted from an external device, the print command including a command indicating whether to record the print history in the server;
- a control unit configured to record print history concerning image formation by the image formation unit in a server connected to the image forming device via a network when the print command includes the command to record the print history in the server, and to make a judgment on whether the print history has been successfully recorded in the server; and
- a communication unit configured to transmit, to the external device, writing information including information indicating whether the control unit has successfully recorded the print history in the server, based on a result of the judgment by the control unit,
- wherein when the command included in the print command indicates not to record the print history, the image formation unit forms the image while restricting quality of the image.

23. The image forming device according to claim 22, wherein:
- the control unit is configured to write the print history in the server before the image formation unit which has received the print command starts to form the image on the recording medium, and to write the print history in the server after the image formation unit has finished forming the image on the recording medium; and
- when the control unit has not successfully recorded the print history in the server before the image formation unit starts to form the image on the recording medium, the image formation unit stops the image formation.

24. The image forming device according to claim 23, wherein:
- the control unit is configured to record the print history each time the image formation unit finishes the image formation corresponding to one page of the recording medium;
- when the control unit has not successfully recorded the print history in the server, the image formation unit is configured to stop the image formation based on the print command; and
- when the image formation unit stops the image formation, the communication unit transmits, to the external device, the writing information including information indicating a number of pages of the recording medium for which the print history has successfully recorded in the server based on the print command.

25. The image forming device according to claim 22, wherein when the command indicating whether to record the print history in the server is not included in the print command, the control unit records the print history in the server.

26. The image forming device according to claim 22, wherein the communication unit is configured to transmit the writing information to the external device when a command to transmit the writing information is included in the print command, and not to transmit the writing information to the external device when the command to transmit the writing information is not included in the print command.

* * * * *